Patented June 28, 1938

2,122,093

UNITED STATES PATENT OFFICE 2,122,093

OVEN

William Henry Frick, Cleveland, Ohio, assignor to American Stove Company, St. Louis, Mo., a corporation of New Jersey Application August 11, 1936, Serial No. 95,449

16 Claims. (Cl. 126—273)

This invention relates to improvements in ovens and more particularly to a novel burner and flue arrangement for portable pastry or bake ovens to provide an oven in which it is possible to control the heat in the bottom and top areas or portions of the oven.

Accordingly, the primary object of the invention is the provision of a novel oven so constructed and arranged as to make it possible to definitely control the heat delivery to and temperature in the bottom and top areas of the oven.

Another object of the invention is the provision of a novel fuel arrangement for the oven which is such as to enable the aforementioned desired heat control in the oven.

Another and still further object of the invention is the provision of a novel and improved arrangement of combustion chamber and burner therefor.

Other specific objects, novel features of construction and improved results of the present invention will appear in particular from the following description when read in the light of the accompanying drawings.

In the accompanying drawings which illustrate one and a preferred embodiment of the present invention:

Fig. 4 is a view in front elevation of the improved oven.

Figure 1:
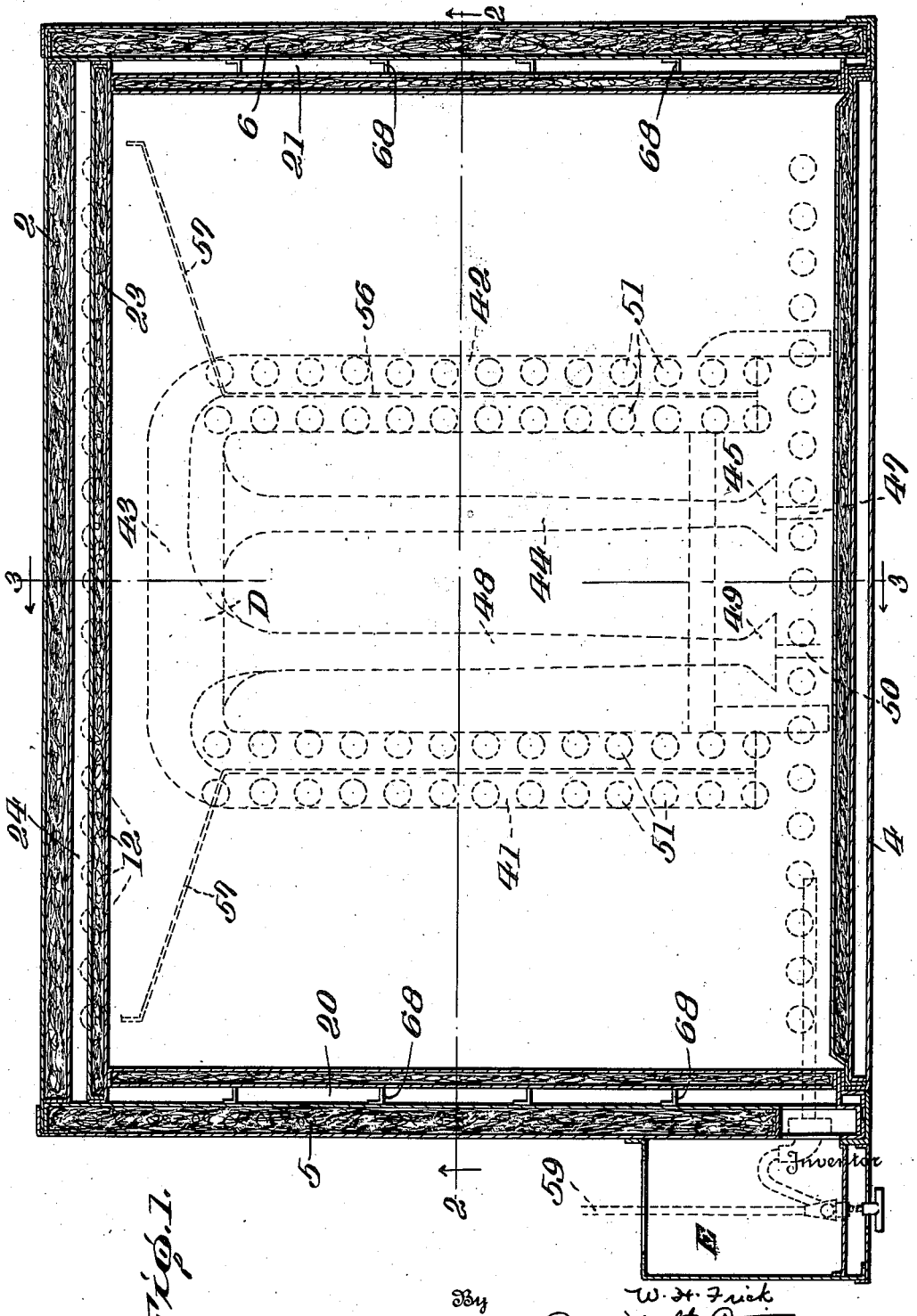
Fig. 1 is a horizontal sectional view through an oven constructed in accordance with the present invention.

The desirability of an oven which provides for the separate control of heat to and in the top and bottom areas of the baking or cooking compartment of the oven has been long recognized. Such a control of the heat is highly desirable and particularly when the oven is being used for the baking of breads, rolls, pastries or the like which particularly require variable degrees of heat in the top and bottom areas of the cooking compartment of the oven. This control of heat is not only desirable but is really necessary to obtain a finished product of the highest quality. It will be readily understood that with such a heat control it will be possible to bake evenly and to avoid over-cooking or burning of the bottom of the product or causing over-cooking or burning of the top of the product. Recognizing the above desirable qualifications of an oven for the accomplishment of the best possible baking and cooking, the present improved invention has been conceived and perfected, and having reference now to the drawings in which like parts are designated by similar reference numerals, specific description of the improved oven is hereinafter given.

In the drawings a portable type of oven is illustrated but it is to be understood that the present improvements could equally well be built into a non-portable oven. Describing that particular embodiment of the invention as it appears in the drawings, I designates a base upon which is mounted a combustion chamber A upon which is superimposed the baking or cooking chamber B.

In conformity with the present practice of providing cooking equipment which is fully insulated, the present device has an insulated back wall 2 and a heavily insulated top 3. The front of the cooking or baking chamber is closed by a heavily insulated door 4 and the side walls 5 and 6 are also heavily insulated.

The combustion chamber is defined by the rear wall 2 and the side walls 5 and 6 in conjunction with a bottom 7 and an insulated front wall 8 which is inset and in spaced parallel relationship to panels 9 and 10 positioned at the lower front of the range. The panel 9 is readily removable to afford access to the chamber C which is intermediate the front of the device and the front wall 8 of the combustion or burner chamber.

The combustion chamber is closed at its upper end by a fully insulated top 11 which at its rear end is provided with a plurality of aligned separated openings 12 which communicate with a passage or flueway 13 which is below a fully insulated member or plate 14 which is arranged in spaced parallel relationship to the bottom 15 of the baking oven to provide a second channel or flueway 16 which parallels the aforementioned flueway 13 and has communication therewith at its front end through a plurality of separated aligned openings 17.

It has been mentioned that the cooking or baking oven is highly insulated due to the double wall construction, but in reality the cooking chamber is in a sense doubly insulated in that the chamber is defined by internal insulated side walls 18 and 19 which are parallel to and spaced from the previously mentioned outer side walls 5 and 6. The disposition of the supplemental inner chamber walls 18 and 19 is such as to form at the sides of the oven vertically disposed flues 20 and 21 which at their lower ends communicate with the burner or combustion chamber A as indicated at 20' and 21' and at their upper ends communicate with the baking chamber through a plurality of spaced aligned openings 22. The baking oven also has an inner supplemental rear wall which is of a double wall construction and insulated as appears at 23. This rear wall 23 is arranged in spaced parallel relationship to the outer rear wall 2 so as to form a vertically disposed flue 24 across the entire width of the rear of the baking chamber. This flue, as clearly appears from Fig. 1 of the drawings, has no communication with the side flues 20 and 21 but at its lower end has communication as indicated at 25 with the flueway 16 immediately beneath the baking chamber bottom 15. The upper end of this flueway is closed by a cross member 26 and at a point immediately below this cross member has communication as at 27 with the lower chamber portion 28 of the flue box 29. The upper end of the flue box is adapted for communication with the atmosphere or attachment with a chimney should the use of one be deemed either desirable or advisable.

Figure 3:
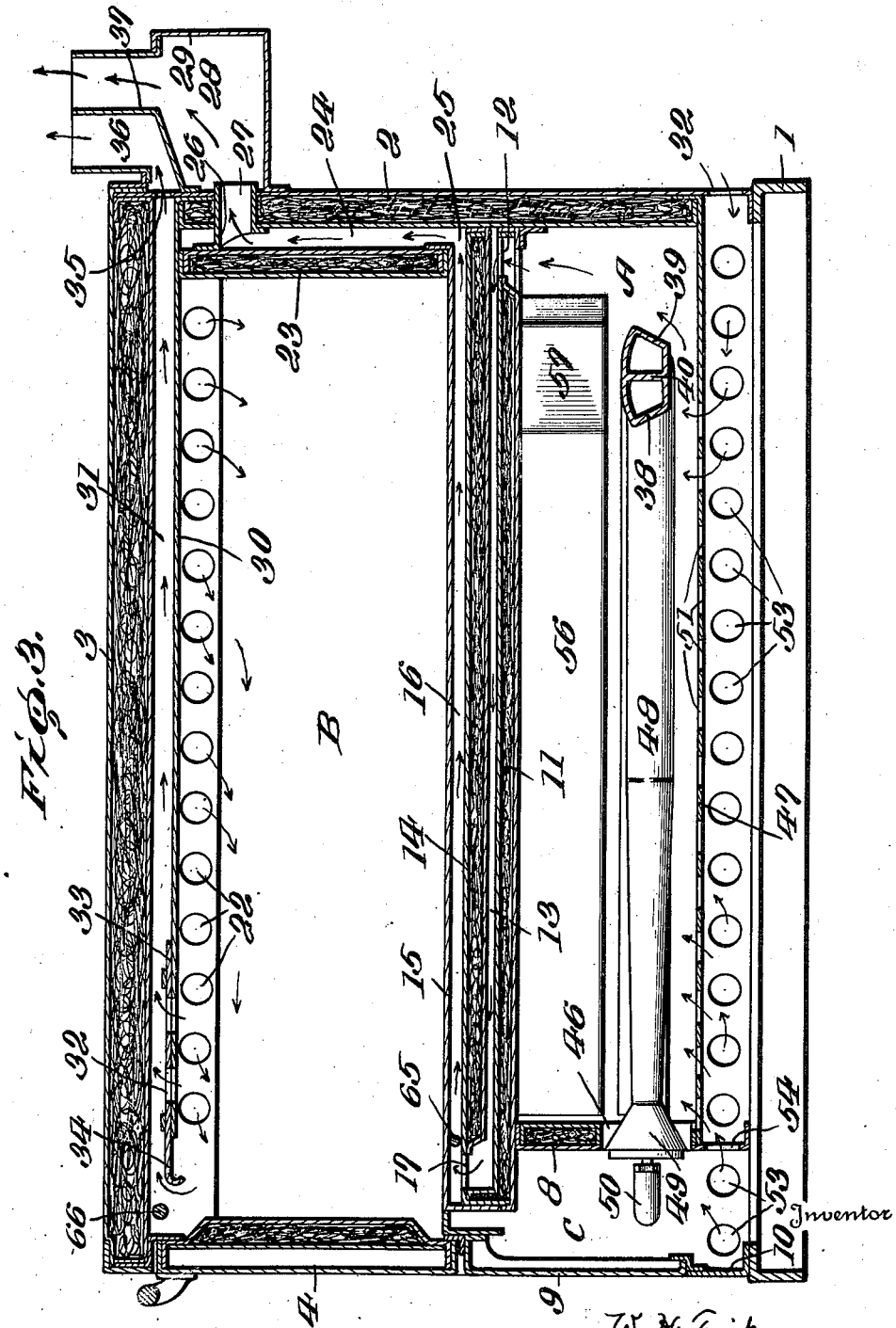
Fig. 3 is a vertical sectional view taken at right angles to Fig. 2 and being on the line 3—3 of Fig. 1 looking in the direction indicated by arrow.

Although the insulated top 3 in a sense forms the top of the baking chamber there is as a matter of fact within the chamber a supplemental top 30 arranged in spaced parallel relationship with the aforementioned top 3 to form a horizontally disposed flueway 31 the front end of which is in communication with the interior of the baking chamber through a plurality of openings 32 which may optionally be closed or partially closed by means of a sliding valve or damper 33 which is operable by a handle 34 which may be reached by opening the baking oven door 4. The rear end of the top-most flue 31 is in communication at its rear end, as indicated at 35 with the upper chamber portion 36 of the flue box it being evident from Fig. 3 of the drawings that a division plate or member 37 divides the flue box into the aforementioned upper and lower chambers 36 and 28 respectively.

Referring now to the burner which is utilized for furnishing the heat to the cooking and baking compartment, this appears at D and is illustrated in the form of a dual burner. The burner comprises separate burner sections or parts 38 and 39 which are cast or formed integrally and are separated one from the other by a partition or web 40. The burner is of a U shape in configuration and comprises the legs 41 and 42 joined together by a base or manifold portion 43 which is positioned adjacent the rear end of the combustion or burner chamber. Gas for the outer burner 39 is obtained from a suitable source of supply and is delivered to the burner through a conventional manifold or mixing tube 44 having a mixing bell 45 which extends through a suitable opening 46 in the front wall 8 of the burner chamber and terminates in the compartment C where gas is delivered to it by a suitable gas supply pipe 47.

The burner 38 receives its gas through the manifold or mixing tube 48 which is provided with a conventional mixing bell 49 which also extends into the chamber C and receives gas from a suitable supply pipe 50.

The burner chamber bottom 7 is provided with a plurality of inlet openings 51 through which pass the secondary air for supporting combustion at the burner. The rear wall 2 of the device is at a point below the combustion chamber bottom provided with a plurality of secondary air inlets 52 and the side walls 5 and 6 are provided with a plurality of secondary air inlet openings 53 some of which communicate with the chamber C. The front wall 8 of the burner chamber at a point below the oven bottom is provided with secondary air inlet openings 54.

It is to be understood that the base 1 will rest upon some suitable support and contact it in such a manner as to make approximately an airtight connection therewith and hence the necessity of the provision of the secondary air inlet openings 52, 53 and 54 immediately hereinbefore described.

Figure 2:
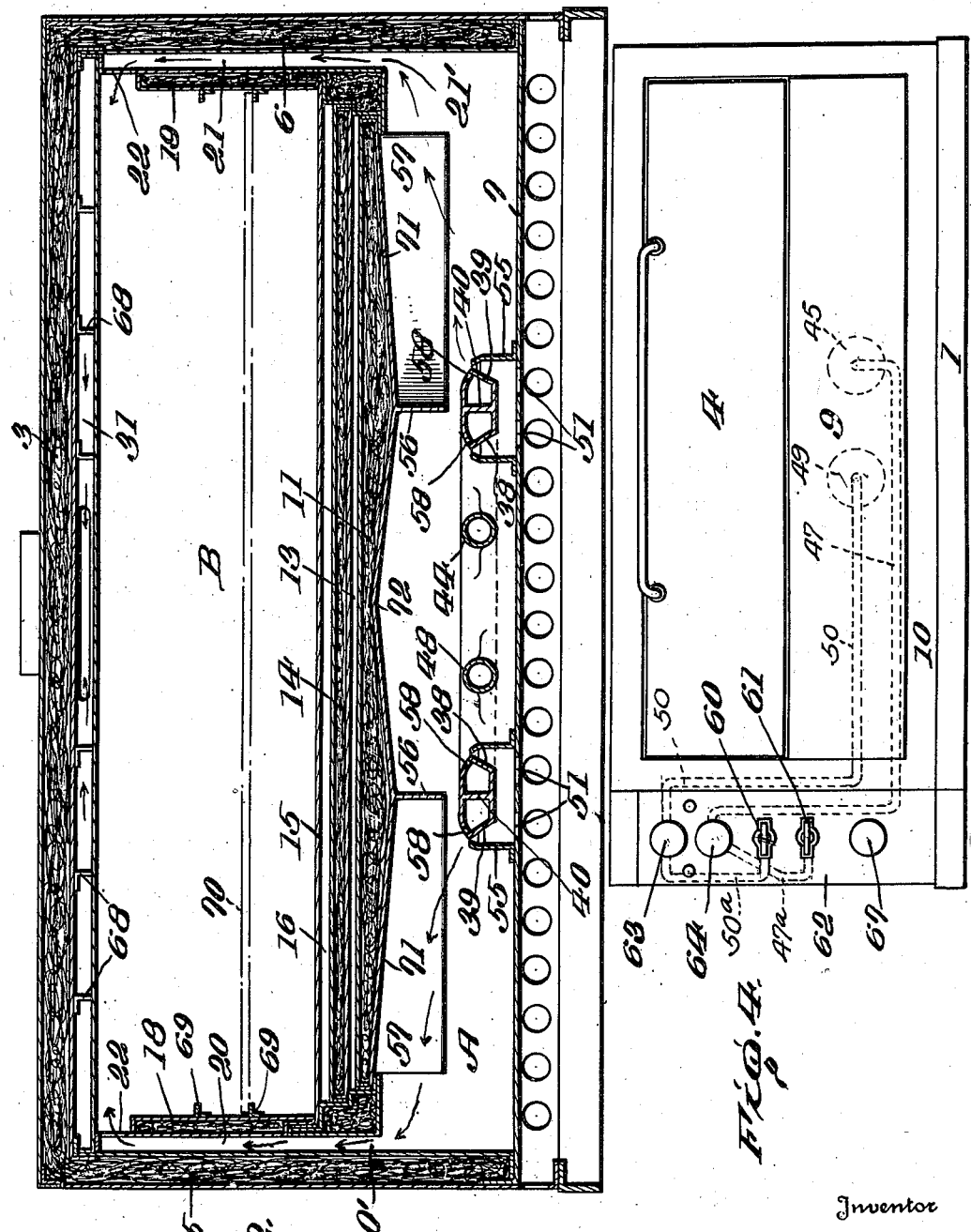
Fig. 2 is a vertical sectional view taken on the line 2—2 of Fig. 1 looking in the direction indicated by arrow.

The dual burner is positioned and supported in spaced relationship above the burner bottom 7 and within a suitable burner housing 55, and by reference to Fig. 2 of the drawings it will be seen that the secondary air inlet openings 51 in the bottom of the burner chamber are within the confines of this burner housing so that all secondary air delivered to the burners is delivered to the lower end of the housing by which it may be properly directed to the burner for supporting and assuring proper combustion.

The burner 38 is for providing the heat for the bottom of the baking chamber while the burner 39 serves to provide heat for the top area of the baking chamber. The delivery of the heat of the respective burners to the top and bottom areas respectively of the baking chamber is accomplished by the flue arrangement heretofore specifically described taken together with the fins or ribs 56 and 57. By reference to Figures 2 and 3 of the drawings it will be seen that these fins or ribs extend downwardly from the under side of the combustion chamber top 11 and that there are two ribs 56 one being disposed in central alignment above each of the legs 41 and 42 of the burner. The burner orifices 58 are positioned in these burners adjacent their outer edges and are drilled at an oblique angle so that the flames are directed upwardly and outwardly from the burner at an angle and to each side of the downwardly extending ribs 56. These ribs 56 extend throughout approximately the entire lengths of the legs of the burner and the burner is provided with orifices only in its leg portions. The rear ends of the fins 56 have portions 57 which extend outwardly and rearwardly at an angle to terminate at a point adjacent the rear wall 6 of the combustion chamber, all of which clearly appears in Fig. 1 of the drawings.

A compartment E is arranged adjacent the front corner at one end of the range and a main gas supply pipe 59 for furnishing fuel to the burner extends into this chamber or compartment where it is under the control of suitable valves 60 and 61 which afford an independent control for the supply of gas to the respective burners 38 and 39. It is intended that the heat in the bottom and top areas of the baking chamber be thermostatically controlled and the front panel 62 of the chamber E in addition to carrying the gas supply control valves 60 and 61 also carries a thermostatic setting and control means 63 for controlling the heat in the top area of the baking chamber and a control or setting handle 64 for controlling the temperature within the bottom area of the baking chamber. Each of the controls 63 and 64 includes a valve which is operated by a thermostatic element hereinafter described. Gas in passing from the manual valve 61 to the mixing bell 45 of the burner 39 travels through pipe 47ª to and through the control 64 and gas in passing from the manual valve 60 to the mixing bell 49 of burner 38 travels through pipe 50ᵃ to and through control 63.

Inasmuch as thermostatic heat controls are well known no specific description of them is necessary other than to say that the setting of these controls will effect a control of the gas supply to the burners so that the desired temperature in the upper and lower areas of the baking chamber will be obtained and maintained. In a control device of this kind it is necessary to have within that portion of the chamber within which the heat is to be controlled a thermostatic element. The thermostat for controlling the heat in the bottom area of the baking oven is indicated at 65 and is positioned adjacent the front end of the flue passageway 16 while the thermostatic element for controlling the heat in the upper area of the baking oven appears at 66 and is positioned adjacent the front end of the flue 31 above the baking oven top 30. These thermostatic elements operate the valves within the controls 63 and 64. The temperature at which these element will operate the valves is determined by the particular setting of the controls 63 and 64.

It is also intended that a pilot light be used in conjunction with the burner and a valve control handle 67 for controlling the supply of gas to the pilot light is conveniently positioned on the front panel 62 of the housing E.

To guard against any possibility of warping which might take place due to the hot gases which pass through the flues 20, 21 and 31 strengthening ribs or webs 68 are disposed in suitable spaced relationship throughout the length of these flue passageways. As is conventional in respect to ovens, the present oven is provided with supports 69 for adjustably receiving a rack which is illustrated at 70 in dotted lines. Under some circumstances however the baking might be done by placing the article directly on the baking oven bottom or baking deck, as it is sometimes called, 15.

It is desirable to assure uniform heat, and this is the purpose of making the top 11 of the combustion chamber in the form of a highly insulated member. In respect to this top member attention is also directed to the fact that this top is given a particular specific cross sectional shape which assists in accomplishing the heating effect desired. This top plate from a point immediately above the center of the two legs of the burner slants upwardly and outwardly as indicated at 71. This inclination serves to assist the heat generated by the burner 39 to travel towards the sides of the oven and up the side flues 20 and 21.

In its center the under side of the top plate 11 is of a V shape in cross section or what might be expressed as being concave in that from a point immediately above the center of the two legs of the burner the plate slants inwardly and upwardly and has centrally a low spot 72. This particular configuration assists in proper distribution and travel of the heat generated by the burner 38.

It has been found that by separating the flues 13 and 16 by an insulated plate or member such as the member 14 a better equalization and distribution of heat is obtained in that hot and cold spots are avoided.

Although a dual type of burner has been illustrated and described it is to be recognized and understood that a burner of this kind is not essential to the present invention. Separate and distinct burners for providing heat to the top and bottom areas of the baking oven could be utilized and the location of these burners could be considerably altered without departing from the spirit of the present invention. As an instance, with separate and distinct burners the burner 39 could be moved any desired distance outwardly towards the outer side walls of the device and likewise the burner 38 could be moved inwardly towards the center of the combustion chamber. As a matter of fact instead of using a U shaped burner a burner of different configuration could be equally well utilized. A burner with a single leg could be utilized in place of the burner 38. As a further possible alteration the burner 39 which furnishes the heat to the top area of the baking oven could be made to have a single leg and could be positioned along or adjacent the rear wall of the combustion chamber. The above alterations though possible are not thought to be as desirable or as efficient as the arrangement illustrated in the accompanying drawings.

Reference has been made to the pilot valve 67. In combination with thermostatic heat controls it has become the practice to provide a constant burning pilot light which functions to prevent the delivery of gas to the burner unless said pilot light is ignited, and in the previous reference to the pilot light valve 67 I wish it to be understood that I am referring to a safety valve which operates in the manner immediately above described.

Although fixed supports for the reception of a baking rack are illustrated and have been described it is to be understood that these supports could be replaced by a suitable lowering or raising device conveniently operable by a handle or lever so that the device can be raised and lowered in respect to the baking oven bottom for the purpose of positioning in different zones of the oven the article being cooked. In those instances where the baking is to be done directly on the oven bottom 15 the raising and lowering device could be positioned in the top of the baking compartment so that it would be out of the way. The present trend is towards making cooking appliances as pleasing as possible in appearance and this idea has been incorporated into the present device in that valves, pipes and the like are concealed within the side chamber or housing E while the ends of the burner mixing tubes and the pipes which supply gas to them are positioned within the chamber C and concealed behind the front panel 9.

Attention is also directed to the fact that the outlet flues to the combustion chamber and the baking oven are separate and distinct.

Having described the construction in detail a few words will suffice to explain its operation. With the provision of the thermostatic control the control handles 63 and 64 are set to provide the desired temperatures in the top and bottom areas of the baking oven. The heat generated and delivered by the burner 38 passes rearwardly under the combustion chamber top 11 in the channelway which is formed by the fins or ribs 56 and when it reaches the rear of this channelway spreads laterally within the chamber formed by the rib extensions 57 and passes upwardly through the openings 12 into the flue 13. These hot combustion gases enter the rear end of this flue and traverse it forwardly to enter the flue passageway 16 at the front end thereof. In traversing the flue 16 the hot gases move rearwardly immediately under the baking oven bottom 15 and flow over and around the thermostatic element 65 which controls the gas supply to the burner 38. The hot gases when they reach the rear end of the flue 16 then move upwardly through the vertical flue 24 behind the rear wall 23 of the baking oven and from this flue into the flue box for discharge. Thus it will be seen that the burner 38 furnishes heat to the bottom of the baking or cooking oven chamber.

The hot products of combustion from each of the legs of the burner 39 travel laterally under the combustion chamber top 11 and flow upwardly through the side flues 20 which are behind the side walls of the oven and enter the top of the oven through the apertures 22 formed in the side walls at the top ends of these flues. From the top of the baking oven these hot products of combustion move forwardly and pass into the flue 31 through the apertures 32 which are under the control of the damper and also pass over and around the thermostatic element 66 which controls the gas supply to the burner 39. In passing along the flue 31 these hot products of combustion traverse the entire top of the baking chamber and are discharged from the rear end of the flue into the outlet passage 36 for discharge. Thus it will be seen that the burner 39 serves to heat the top or upper area of the baking chamber.

It is not intended that the damper 33 ever completely close off communication between the interior of the baking oven and the flue 31. This valve is for the purpose of affording means for increasing or decreasing ventilation or draft. The control of the temperature in the upper area of the oven is primarily controlled by the thermostatic element 66 in cooperation with the fuel delivery to the burner 39.

Although a thermostatic control of heat has been described it is to be understood that such a control is not absolutely essential and that heat control in the upper and lower zone of the baking chamber could be obtained by a manual manipulation or operation of the gas valves of the respective burners 38 and 39. These valves could be manually set to maintain at their respective burners a flame of the desired size to furnish in the different zones of the oven the desired temperature for accomplishing the particular cooking to be done. Also the heat in the upper zone of the oven is controllable to some extent through the manual operation of the damper 33 but it is to be understood however that in the ordinary use of the device the setting of the damper 33 is rarely altered once it has been properly adjusted.

From the foregoing it will be seen that an improved oven which is comparatively cheap of manufacture yet highly efficient in operation has been provided. Alterations in the specific construction illustrated are possible as has been explained, but the inventive concept is not to be limited other than as particularly expressed in the following claims.

I claim:

1. In a cooking device, an oven chamber, a pair of gaseous fuel burners for heating said oven chamber, a thermostatically operated means for each of said burners for controlling the supply of fuel thereto, means to deliver the heat generated by one burner to the upper area of said oven, thermal means in said oven at its upper area for operating the fuel control means of said burner, means to deliver the heat generated by the other burner to the lower area of said oven chamber, and thermal means in the heat supply located at the lower oven area to said oven area for operating the heat control means of said last named burner.

2. In a cooking device, a casing, an oven within said casing and spaced therefrom at its sides top bottom and rear, a burner chamber in said casing beneath the oven chamber and having therein a pair of gaseous fuel burners, the spaces at the sides of the oven communicating with the burner chamber and with the top of the oven chamber, the space above the oven chamber communicating with the oven and with the atmosphere, a flue passageway beneath the oven bottom and communicating with the burner chamber and with the space behind the oven, said last named space communicating with the atmosphere, and means within the burner chamber for causing the heat generated by one burner to be delivered to the top of the oven chamber and the heat generated by the other burner to traverse the flue passageway beneath the oven bottom and the flue passageway at the rear of the oven chamber.

3. In a cooking device, an oven chamber and a burner chamber, flue passageways communicating with the burner chamber at its sides and with the oven chamber at its top, a flue outlet communicating with the top of the oven chamber, a flue passageway communicating with the central rear portion of the burner chamber and passing under the oven chamber bottom and discharging to atmosphere, a pair of gaseous fuel burners in the burner chamber, and means associated with said burners for causing the heat generated by one of them to be directed to the side areas of the burner chamber and the heat generated by the other burner to the central and rear areas of the burner chamber, for the purpose described.

4. In a cooking device, an oven chamber and a burner chamber therebeneath, a pair of gaseous fuel burners in said burner chamber, one of said burners adapted to direct its flames towards the sides of said chamber, the other burner adapted to direct its flames towards the center of said chamber, partition means above said burners and positioned between the flames burned at said burners, flue means communicating with the burner chamber at one side of said partition for conducting and delivering heat into the top of the oven chamber, and flue means communicating with the space at the opposite side of said partitions for delivering heat against the under side of the oven bottom, for the purpose described.

5. In a cooking device, an oven chamber and a burner chamber therebeneath, a pair of gaseous fuel burners made integral and of a U shape, the legs of said burner extending from the front towards the rear of said burner chamber and provided with spaced aligned burner orifices, the burner orifices of one burner arranged in spaced parallel relationship to the burner orifices of the other burner, a pair of baffles depending from the top of said burner chamber to a point closely adjacent said burners and positioned within and extending throughout the length of the space between the burner orifices of the two burners, said baffles dividing the upper portion of said burner chamber into two side areas and a central area, the heat generated by one of said burners being directed into the side areas of the burner chamber and the heat generated by the other burner being directed into the central area of the burner chamber, flue passageways communicating with the side areas of the burner chamber and with the top of the oven chamber, an outlet flue for the top of the oven chamber, and a flueway communicating with the central area of the burner chamber and passing under the bottom of the oven chamber and communicating with the atmosphere for the purpose described.

6. A construction such as defined in claim 5, wherein a thermostatically operated fuel control means is provided for each of said burners, and a thermally sensitive member is positioned to be responsive to the heat in the top of the oven and in the flueway under the bottom of the oven for causing the operation of the fuel control of its respective burner.

7. A gas range comprising a housing having a transversely arranged partition dividing it into a lower burner and upper oven compartments, two burners located below the said partition, passageways receiving heat from one of said burners and conveying it into the upper portion of the oven only and passageways supplying heat from the other burner to the lower portion of the said oven only, the parts arranged for the purpose set forth.

8. A gas range comprising an oven having a horizontal division composed of two parallel arranged parts having between the parts a horizontal passageway, the oven above the said division having a bottom, two separate depending vertically arranged flanges at opposite sides of said division, two burners one supplying heat between said flanges and the other burner supplying heat outside of said flanges, the space between said flanges communicating with one part of the oven and the division formed by said flanges supplying heat to the other part of the oven, whereby the upper and lower portions of the oven are kept at proper temperatures for cooking purposes.

9. A gas range comprising an oven having a horizontal division, said division composed of two separated insulated portions forming a passageway between them and having communication above and below said insulation, the oven above the insulated portion having a bottom separated from it and forming a passageway communicating with one end of the first mentioned passageway between the insulated portions, two burners located below the said insulated portions one supplying heat to the said passageways and the other supplying heat to the central part of the lower insulated division, and a passageway between one of said burners and the interior of said oven, whereby heated air is supplied to the upper and lower portion of the oven above thereby maintaining the proper heat for carrying on the cooking operations.

10. A gas range comprising an upper oven and a lower burner portion said oven and burner portion divided by a double wall forming a transversely extending passageway, the bottom of the oven separated from said division walls and forming a passage between them, a communication between the rear end of the burner section and one end of the lower passage and the opposite end of the lower passage communicating with the adjacent end of the upper passageway and two burners located in the burner structure one burner supplying heat to the inlet end of the passageways and the other burner supplying heat to the upper portion of the said oven whereby the upper and lower portions of the oven are heated for the purpose of carrying on properly the cooking operations.

11. A gas range comprising a housing having an upper oven and a lower burner portion said oven and burner portion separated by parallel separated partitions forming a passageway between them, the oven having a bottom separated from the said partitions and forming a passageway between it and the partitions, said oven having passageways extending substantially throughout the length of the said oven and said passageways connected with the upper portion of the oven, two burners located in the burner compartment one burner supplying heat to the bottom of the oven through said passageways located below said bottom portion and the other burner supplying heat through the vertical passageways to the interior of the upper portion of the oven whereby heat is supplied to the upper and lower portions of the oven, for the purpose set forth.

12. A range comprising, a housing having therein an oven compartment and a burner chamber therebeneath, a heating element in said burner compartment, a passageway for conveying heat to the upper portion only of the oven, a passageway for conveying and confining heat to the lower portion only of the oven, and means associated with said heating element for directing a portion of the heat generated by said element into each of said passageways.

13. A gas range comprising, a housing having therein an oven compartment and a burner chamber therebeneath, a gaseous fuel heater in said burner chamber, means associated with said heating element for directing a portion of its heat to one portion of said burner chamber and the remaining portion of its heat into another portion of said burner chamber, means for conveying one portion of the heat to the upper area only of the oven, and means for conveying the remaining portion of the heat to the lower portion only of the oven, for the purpose described.

14. A gas range comprising, a housing having a transversely arranged partition dividing it into a lower burner chamber and an upper oven compartment, a pair of burners located within the burner compartment, a passageway receiving heat from one of said burners and conveying it to the upper portion only of the oven, and a passageway receiving heat from the other burner and conveying it to the lower portion only of said oven, the parts being arranged for the purpose set forth.

15. In a cooking device, an oven chamber, gaseous fuel burner for heating the upper area only of said oven, a second gaseous fuel burner for heating the lower area only of said oven, an adjustable thermostatically operated means for each of said burners for controlling the supply of fuel thereto, thermal means disposed to be responsive to the temperature in the upper area of the oven for operating the fuel control means of the first burner, and a second thermal means disposed to be responsive to the temperature in the lower area of the oven for operating the fuel control means of the second burner.

16. A construction such as defined in claim 7, wherein means is provided for controlling the escape of heat from the oven compartment.

WILLIAM HENRY FRICK.